United States Patent
Wang et al.

(10) Patent No.: US 8,433,820 B2
(45) Date of Patent: Apr. 30, 2013

(54) METHOD AND SYSTEM FOR CONSERVING BATTERY POWER IN WIRELESS DEVICES OPERATING IN A WIRELESS LOCAL AREA NETWORK

(75) Inventors: James Wang, Richmond Hill (CA); Rudy Rawlins, Scarborough (CA)

(73) Assignee: Research In Motion Limited, Waterloo, Ontario (CA)

( * ) Notice: Subject to any disclaimer, the term of this patent is extended or adjusted under 35 U.S.C. 154(b) by 2170 days.

(21) Appl. No.: 11/350,942

(22) Filed: Feb. 10, 2006

(65) Prior Publication Data

US 2007/0192437 A1 Aug. 16, 2007

(51) Int. Cl.
  *G06F 15/16* (2006.01)
  *H04W 4/00* (2009.01)
  *H04M 3/42* (2006.01)
  *G01R 31/08* (2006.01)

(52) U.S. Cl.
  USPC ........ 709/245; 709/203; 709/219; 455/435.1; 455/414.2; 370/227; 370/331

(58) Field of Classification Search .................. 709/203, 709/219, 245; 455/435.1, 414.2; 370/227, 370/331
  See application file for complete search history.

(56) References Cited

U.S. PATENT DOCUMENTS

| 7,042,988 B2 * | 5/2006 | Juitt et al. ................. 379/88.17 |
| 2003/0073449 A1 * | 4/2003 | Motegi et al. ................. 455/458 |
| 2004/0120279 A1 | 6/2004 | Huckins |
| 2004/0255008 A1 * | 12/2004 | Olsen et al. ................... 709/220 |
| 2004/0264435 A1 * | 12/2004 | Chari et al. ................... 370/351 |
| 2005/0254444 A1 * | 11/2005 | Meier et al. ................... 370/312 |
| 2005/0286466 A1 * | 12/2005 | Tagg et al. ................... 370/329 |
| 2006/0252435 A1 * | 11/2006 | Henderson et al. ........... 455/466 |

FOREIGN PATENT DOCUMENTS

EP 1 361 702 A1 11/2003

* cited by examiner

*Primary Examiner* — Ranodhi Serrao
(74) *Attorney, Agent, or Firm* — McCarthy Tétrault LLP

(57) ABSTRACT

A method for conserving battery power in a wireless device coupled through an access point to a server in a network, the server being coupled to at least one client in the network, each of the wireless device, the at least one client, and the access point having a respective hardware address, the method comprising: receiving at the server through the access point a message indicative of the wireless device joining the network and providing the hardware address of the wireless device; updating a list of hardware addresses for clients in the network to include the hardware address of the wireless device, the list including a respective Internet Protocol ("IP") address for each hardware address; and, sending from the server to at least one of the wireless device, the at least one client, and the access point, the updated list of hardware addresses.

42 Claims, 5 Drawing Sheets

METHOD AND SYSTEM FOR CONSERVING BATTERY POWER IN WIRELESS DEVICES OPERATING IN A WIRELESS LOCAL AREA NETWORK

FIELD OF THE APPLICATION

This application relates to the field of wireless communications between wireless and other devices, and more specifically, to a method and system for conserving battery power in wireless devices operating in a wireless local area network.

BACKGROUND

Current wireless mobile communication devices include microprocessors, memory, soundcards, and run one or more software applications in addition to providing for voice communications. Examples of software applications used in these wireless devices include micro-browsers, address books, email clients, instant messaging ("IM") clients, and wavetable instruments. Additionally, wireless devices have access to a plurality of services via the Internet. A wireless device may, for example, be used to browse web sites on the Internet, to transmit and receive graphics, and to execute streaming audio and/or video applications. The transfer of Internet content to and from wireless device is typically facilitated by the Wireless Application Protocol ("WAP"), which integrates the Internet and other networks with wireless network platforms. Such wireless devices may operate on a cellular network, on a wireless local area network ("WLAN"), or on both of these types of networks.

With respect to WLANs, the term "Wi-Fi" ("Wireless Fidelity") pertains to certain types of WLANs that use specifications in the Institute of Electrical and Electronics Engineers ("IEEE") 802.11 family. The term Wi-Fi was created by an organization called the Wi-Fi Alliance, which oversees tests that certify product interoperability. The particular specification under which a Wi-Fi network operates is called the "flavour" of the network. Wi-Fi has gained acceptance in many businesses, office buildings, agencies, schools, and homes as an alternative to a wired local area network ("LAN"). All the 802.11 specifications use the Ethernet protocol and Carrier Sense Multiple Access with Collision Avoidance ("CSMA/CA") for path sharing. The original modulation used in 802.11 was phase-shift keying ("PSK"). However, other schemes, such as complementary code keying ("CCK"), are used in some of the newer specifications. The newer modulation methods provide higher data speed and reduced vulnerability to interference. In addition, to improve security, entities running a WLAN often use security safeguards such as encryption or a virtual private network ("VPN").

In a WLAN, an "access point" is a station that transmits and receives data (sometimes referred to as a transceiver). An access point connects users to other users within the network and also can serve as the point of interconnection between the WLAN and a wired LAN. Each access point can serve multiple users within a defined network area. As users move beyond the range of one access point (i.e., when they roam), they are automatically handed over to the next one. A small WLAN may only require a single access point. The number of access points required increases as a function of the number of network users and the physical size of the network. The access point is typically an IEEE 802.11 (i.e., Wi-Fi) radio receiver/transmitter (or transceiver) and functions as a gateway or bridge between a WLAN and a wired LAN.

Now, the Address Resolution Protocol ("ARP") is a protocol for mapping an Internet Protocol ("IP") address to a physical machine address that is recognized in the local network. For example, in IP Version 4 ("IPv4"), an address is 32 bits long. In an Ethernet local area network, however, addresses for attached devices are 48 bits long. The physical machine address is also known as a Media Access Control or "MAC" address. A table or list, usually called the ARP cache, is used to maintain a correlation between each MAC address and its corresponding IP address. ARP provides the protocol rules for making this correlation and providing address conversion in both directions. Thus, the term "address resolution" refers to the process of finding an address of a computer in a network. The address is "resolved" using a protocol in which a piece of information is sent by a client process executing on a local computer to a server process executing on a remote computer. The information received by the server allows the server to uniquely identify the network system for which the address was required and therefore to provide the required address. The address resolution procedure is completed when the client receives a response from the server containing the required address. To reduce the number of address resolution requests, a client normally caches resolved addresses for a (short) period of time. The ARP cache is of a finite size, and would become full of incomplete and obsolete entries for computers that are not in use if it was allowed to grow without check. The ARP cache is therefore periodically flushed of all entries. This deletes unused entries and frees space in the cache. It also removes any unsuccessful attempts to contact computers which are not currently running. So, when a first computer tries to contact a second computer on the same network, and if no previous IP datagrams have been received from this second computer, ARP must first be used to identify the MAC address of the second computer. Accordingly, an ARP request message is broadcast on the network and is received by all computers on the network, including the second computer. Only the second computer responds to the ARP request, the other computers on the network discard the request. The second computer forms an ARP response message which is unicast to the address of the first computer.

In particular, when a packet destined for a device on a network is to be sent, the originating device asks the ARP program to find a physical host or MAC address that matches the IP address. The ARP program looks in the ARP cache and, if it finds the address, provides it so that the packet can be converted to the right packet length and format and sent to the device. If no entry is found for the IP address, ARP broadcasts a request packet in a special format to all the devices on the network to see if one device knows that it has that IP address associated with it. A device that recognizes the IP address as its own returns a reply so indicating. ARP updates the ARP cache for future reference and the packet is sent to the MAC address of the device that replied.

For reference, in a LAN or other network, the MAC (Media Access Control) address is a device's unique hardware number. On an Ethernet LAN, for example, it is the same as an Ethernet address. When a device is connected to the Internet, a correspondence table or list (e.g., an ARP cache) relates the IP address to the computer's physical MAC address on the LAN. The MAC address is used by the MAC sublayer of the Data-Link Layer ("DLC") of telecommunication protocols. There is a different MAC sublayer for each physical device type.

Wireless devices are typically battery operated. As such, conserving battery power is important as doing so allows the wireless device to operate for an extended period of time. To conserve battery power, the wireless device will typically enter a "sleep mode" when it is not actively participating in a communication. During this sleep mode the wireless device will still monitor activity on the WLAN to determine if it should "wake up" and enter into a communication.

One problem with wireless devices operating in a WLAN is that when an ARP request is broadcast on the WLAN, the wireless devices must wake up and process the ARP request. When a wireless device wakes up it consumes battery power which may reduce battery life. However, each ARP request is generally meant for only one wireless device on the WLAN and not all wireless devices. Consequently, battery power is wasted in those wireless devices for which the ARP request is not meant.

A need therefore exists for an improved method and system for conserving battery power in wireless devices operating in a wireless local area network. Accordingly, a solution that addresses, at least in part, the above and other shortcomings is desired.

BRIEF DESCRIPTION OF THE DRAWINGS

Features and advantages of the embodiments of the present application will become apparent from the following detailed description, taken in combination with the appended drawings, in which.

It will be noted that throughout the appended drawings, like features are identified by like reference numerals.

DETAILED DESCRIPTION OF THE EMBODIMENTS

Figure 1:
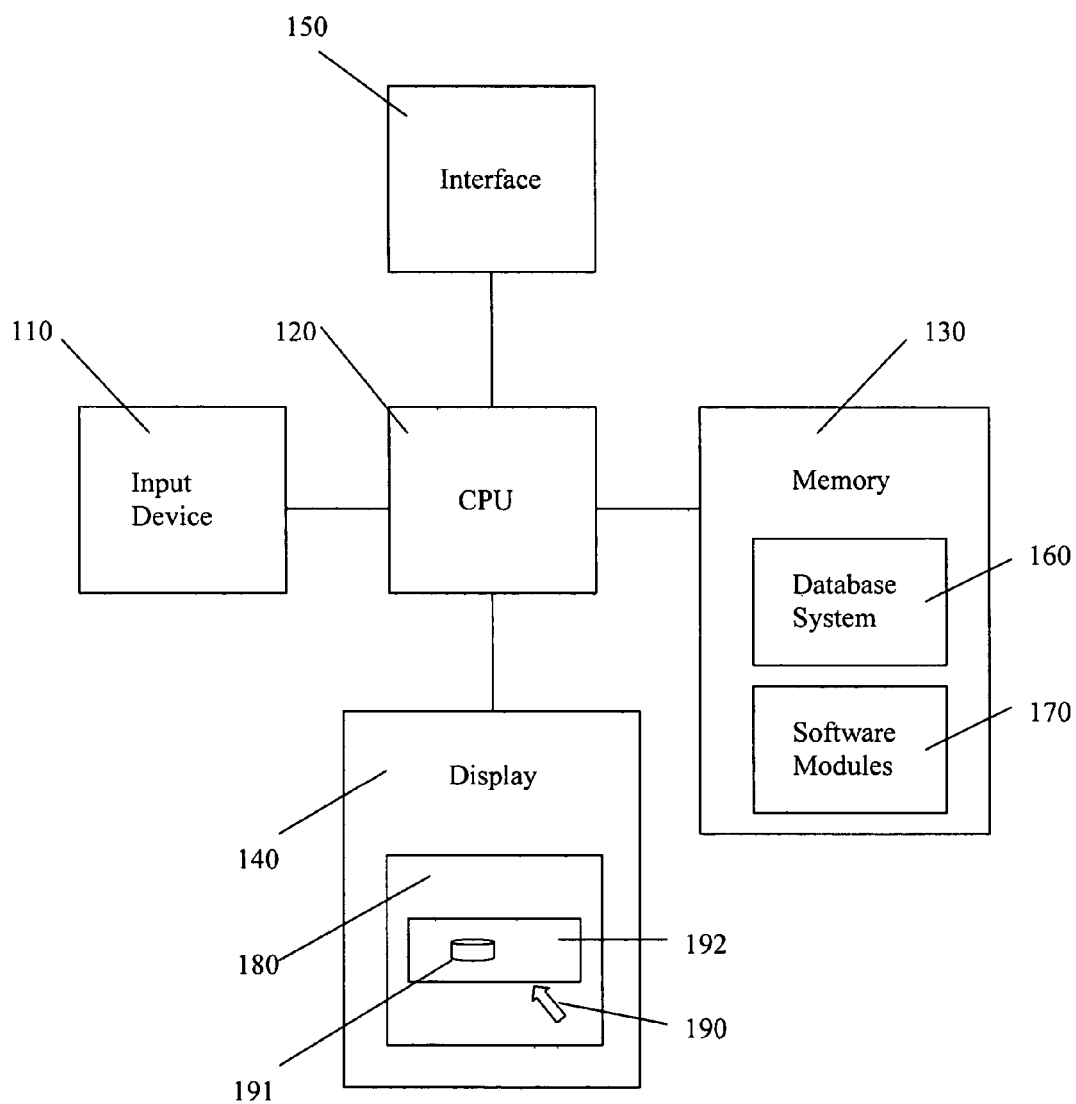
FIG. 1 is a block diagram illustrating a data processing system adapted for implementing an embodiment of the application.

In the following description, details are set forth to provide an understanding of the application. In some instances, certain software, circuits, structures and techniques have not been described or shown in detail in order not to obscure the application. Embodiments of the present application may be implemented in any computer programming language provided that the operating system of the data processing system provides the facilities that may support the requirements of the application. Any limitations presented would be a result of a particular type of operating system or computer programming language and would not be a limitation of the present application.

According to one embodiment, there is provided a method for conserving battery power in a wireless device coupled through an access point to a server in a network, the server being coupled to at least one client in the network, each of the wireless device, the at least one client, and the access point having a respective hardware address, the method comprising: receiving at the server through the access point a message indicative of the wireless device joining the network and providing the hardware address of the wireless device; updating a list of hardware addresses for clients in the network to include the hardware address of the wireless device, the list including a respective Internet Protocol ("IP") address for each hardware address; and, sending from the server to at least one of the wireless device, the at least one client, and the access point, the updated list of hardware addresses to thereby reduce a number of request messages broadcast on the network for information that is contained in the updated list that the wireless device need leave a sleep mode to process.

The method may further include assigning an IP address to the wireless device. Each hardware address may be a Media Access Control ("MAC") address. The list may be an Address Resolution Protocol ("ARP") cache and each request message may be an ARP request message. The server may be a Dynamic Host Configuration Protocol ("DHCP") server. The wireless device may be coupled to the access point through a wireless local area network ("WLAN"). The network may be a local area network ("LAN"). The WLAN may be a subnetwork of the network. The access point may include a gateway to the subnetwork. The server may include the access point. The method may further include the server periodically updating the list by sending a unicast request for information message to one of the wireless device, the at least one client, and the access point. The access point may replace the request messages broadcast on the network with a unicast request for information sent to one of the wireless device and the at least one client. The method may further include receiving at the server from the wireless device a request for the updated list. And, the list may be updated by the access point.

In accordance with further aspects of the present application there are provided apparatus such as a data processing system and a wireless device, methods for adapting these, as well as articles of manufacture such as a computer readable medium having program instructions recorded therein for practising the method of the application.

FIG. 1 is a block diagram illustrating a data processing system 100 adapted for implementing an embodiment of the application. The data processing system 100 includes an input device 110, a central processing unit or CPU 120, memory 130, a display 140, and an interface 150. The input device 110 may include a keyboard, mouse, trackball, remote control, or similar device. The CPU 120 may include dedicated coprocessors and memory devices. The memory 130 may include RAM, ROM, or disk devices. The display 140 may include a computer screen, terminal device, or a hardcopy producing output device such as a printer or plotter. And, the interface 150 may include a network connection including an Internet connection and a wireless network 220 connection (see FIG. 2). The data processing system 100 is adapted for communicating with wireless devices 210 over a wireless network 220.

The data processing system 100 may be a server system or a personal computer ("PC") system. The CPU 120 of the system 100 is operatively coupled to memory 130 which stores an operating system (not shown), such as IBM Corporation's OS/2™, UNIX, etc., for general management of the system 100. The interface 150 may be used for communicating to external data processing systems (e.g., client 440 in FIG. 4) through a network (such as the Internet) or wireless network 220 (see FIG. 2). Examples of suitable platforms for the system 100 include iSeries™ servers and ThinkCentre™ personal computers available from IBM Corporation. The system 100 may include application server software (not shown), such as WebLogic® Server available from BEA Systems, Inc., for developing and managing distributed applications.

The data processing system 100 may include a database system 160 for storing and accessing programming information. The database system 160 may include a database management system ("DBMS") and a database and is stored in the memory 130 of the data processing system 100.

The data processing system 100 includes computer executable programmed instructions for directing the system 100 to implement the embodiments of the present application. The programmed instructions may be embodied in one or more software modules 170 resident in the memory 130 of the data processing system 100. Alternatively, the programmed instructions may be embodied on a computer readable medium (such as a CD disk or floppy disk) which may be used for transporting the programmed instructions to the memory 130 of the data processing system 100. Alternatively, the programmed instructions may be embedded in a computer-readable signal or signal-bearing medium that is uploaded to a network by a vendor or supplier of the programmed instructions, and this signal or signal-bearing medium may be downloaded through the interface 150 to the data processing system 100 from the network by end users or potential buyers.

The CPU 120 of the system 100 is typically coupled to one or more devices 110 for receiving user commands or queries and for displaying the results of these commands or queries to the user on a display 140. As mentioned, the memory 130 may include a variety of storage devices including internal memory and external mass storage typically arranged in a hierarchy of storage as understood to those skilled in the art.

A user may interact with the data processing system 100 and its software modules 170 using a graphical user interface ("GUI") 180. The GUI 180 may be web-based and may be used for monitoring, managing, and accessing the data processing system 100. GUIs are supported by common operating systems and provide a display format which enables a user to choose commands, execute application programs, manage computer files, and perform other functions by selecting pictorial representations known as icons, or items from a menu through use of an input or pointing device such as a mouse 110. In general, a GUI is used to convey information to and receive commands from users and generally includes a variety of GUI objects or controls, including icons, toolbars, drop-down menus, text, dialog boxes, buttons, and the like. A user typically interacts with a GUI 180 presented on a display 140 by using an input or pointing device (e.g., a mouse) 110 to position a pointer or cursor 190 over an object 191 and by "clicking" on the object 191.

Typically, a GUI based system presents application, system status, and other information to the user in "windows" appearing on the display 140. A window 192 is a more or less rectangular area within the display 140 in which a user may view an application or a document. Such a window 192 may be open, closed, displayed full screen, reduced to an icon, increased or reduced in size, or moved to different areas of the display 140. Multiple windows may be displayed simultaneously, such as: windows included within other windows, windows overlapping other windows, or windows tiled within the display area.

Figure 2:
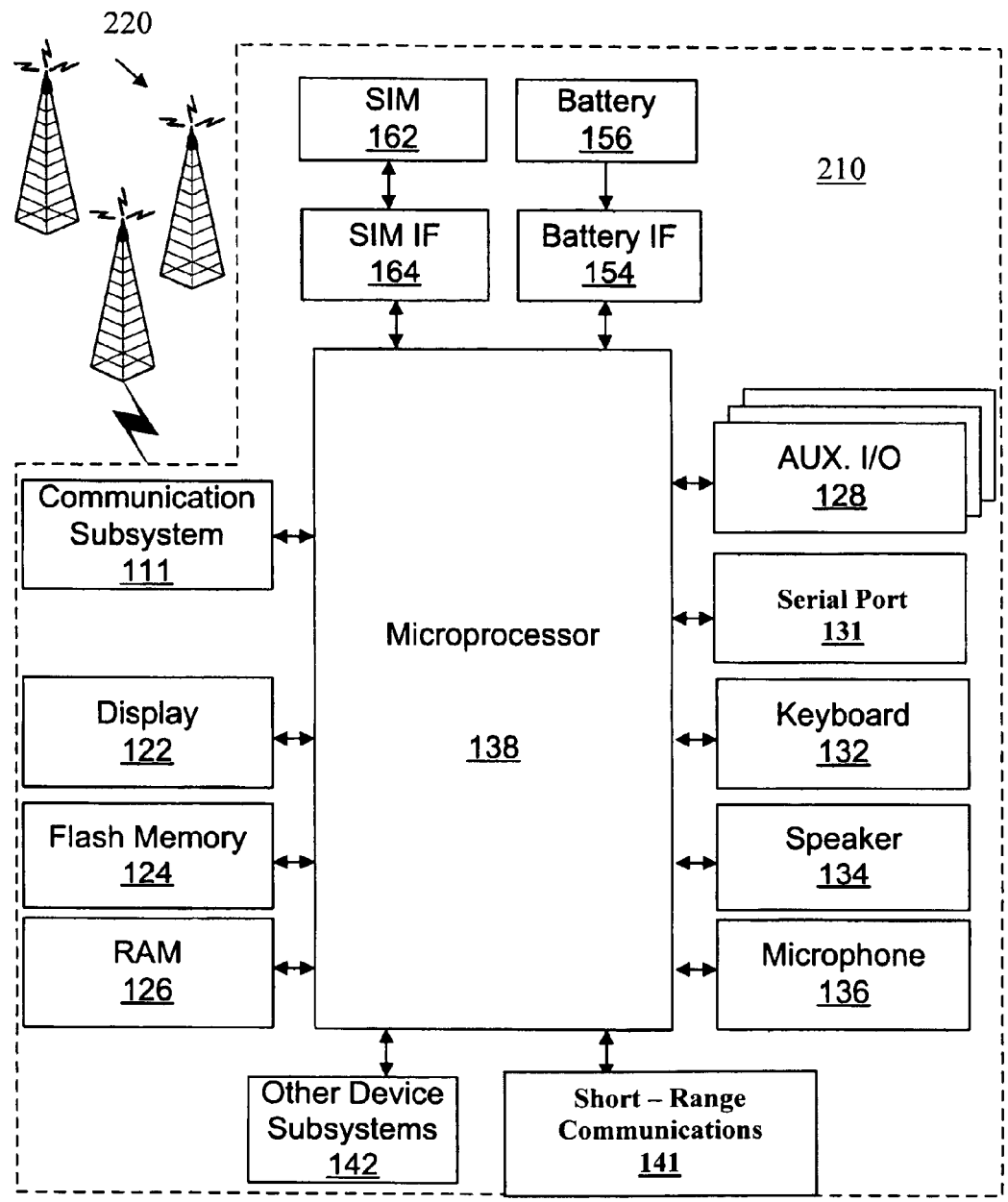
FIG. 2 is a block diagram illustrating a wireless device and a wireless communications system adapted for implementing an embodiment of the application.

FIG. 2 is a block diagram illustrating a wireless device 210 and a wireless network 220 adapted for implementing an embodiment of the application. The wireless network 220 includes antenna, base stations, and supporting radio equipment, known to those of ordinary skill in the art, for supporting wireless communications between the wireless device 210 and the data processing system 100. The wireless network 220 may be coupled to a wireless network gateway (e.g., access point 410 in FIG. 4) and to a wide area network (e.g., wired LAN 430 in FIG. 4) to which the data processing system 100 may be coupled through its interface 150.

The wireless device 210 is a two-way communication device having voice and/or advanced data communication capabilities, including the capability to communicate with other computer systems 100. Depending on the functionality provided by the device 210, it may be referred to as a data messaging device, a two-way pager, a cellular telephone with data messaging capabilities, a wireless Internet appliance, a data communication device (with or without telephony capabilities), a Wi-Fi device, or a WLAN device. The device 210 may communicate with any one of a plurality of fixed transceiver stations (e.g., access point 410 in FIG. 4) within its geographic coverage area.

The wireless device 210 will normally incorporate a communication subsystem 111, which includes a RF receiver, a RF transmitter, and associated components, such as one or more (preferably embedded or internal) antenna elements, local oscillators ("LOs"), and a processing module such as a digital signal processor ("DSP") (all not shown). As will be apparent to those skilled in the field of communications, the particular design of the communication subsystem 111 depends on the communication network 220 in which the device 210 is intended to operate.

Cellular network access may be associated with a subscriber or user of the device 210 and therefore the device 210 typically has a Subscriber Identity Module (or "SIM" card) 162 to be inserted in a SIM interface ("IF") 164 in order to operate on the network (e.g., a GSM network).

The device 210 is a battery-powered device so it also includes a battery IF 154 for receiving one or more rechargeable batteries 156. Such a battery 156 provides electrical power to most if not all electrical circuitry in the device 210, and the battery IF 154 provides for a mechanical and electrical connection for it. The battery IF 154 is coupled to a regulator (not shown) which provides power to the circuitry of the device 210.

The wireless device 210 includes a microprocessor 138 which controls overall operation of the device 210. Communication functions, including at least data and voice communications, are performed through the communication subsystem 111. The microprocessor 138 also interacts with additional device subsystems such as a display 122, a flash memory 124 or other persistent store, a random access memory ("RAM") 126, auxiliary input/output ("I/O") subsystems 128, a serial port (e.g., a universal serial bus ("USB") port) 131, a keyboard 132, a clickable thumbwheel (not shown), a speaker 134, a microphone 136, a short-range communications subsystem 141, and any other device subsystems generally designated at 142. Some of the subsystems shown in FIG. 2 perform communication-related functions, whereas other subsystems may provide "resident" or on-device functions. Notably, some subsystems, such as the keyboard 132, display 122, and clickable thumbwheel, for example, may be used for both communication-related functions, such as entering a text message for transmission over a communication network, and device-resident functions such as a calculator or task list. Operating system software used by the microprocessor 138 is preferably stored in a persistent store such as the flash memory 124, which may alternatively be a read-only memory ("ROM") or similar storage element (not shown). Those skilled in the art will appreciate that the operating system, specific device applications, or parts thereof, may be temporarily loaded into a volatile store such as RAM 126.

The microprocessor 138, in addition to its operating system functions, preferably enables execution of software applications on the device 210. A predetermined set of applications which control basic device operations, including at least data and voice communication applications, will normally be installed on the device 210 during its manufacture. A preferred application that may be loaded onto the device 210 may be a personal information manager ("PIM") application having the ability to organize and manage data items relating to the user such as, but not limited to, instant messaging ("IM"), email, calendar events, voice mails, appointments, and task items. Naturally, one or more memory stores are available on the device 210 and SIM 162 to facilitate storage of PIM data items and other information.

The PIM application preferably has the ability to send and receive data items via the wireless network 220. In a preferred embodiment, PIM data items are seamlessly integrated, synchronized, and updated via the wireless network, with the wireless device user's corresponding data items stored and/or associated with a host computer system such as the data processing system 100 (or server 100 in FIG. 4) thereby creating a mirrored host computer on the device 210 with respect to such items. This is especially advantageous where the host computer system is the wireless device user's office computer system. Additional applications may also be loaded onto the device 210 through the network 220, the auxiliary I/O subsystem 128, the serial port 131, the short-range communications subsystem 141, or any other suitable subsystem 142, and installed by a user in RAM 126 or preferably in a non-volatile store (not shown) for execution by the microprocessor 138. Such flexibility in application installation increases the functionality of the device 210 and may provide enhanced on-device functions, communication-related functions, or both. For example, secure communication applications may enable electronic commerce functions and other such financial transactions to be performed using the wireless device 210.

In a data communication mode, a received signal such as a text message, an email message, or web page download will be processed by the communication subsystem 111 and input to the microprocessor 138. The microprocessor 138 will preferably further process the signal for output to the display 122 and/or to the auxiliary I/O device 128. A user of the wireless device 210 may also compose data items, such as email messages, for example, using the keyboard 132 in conjunction with the display 122, the clickable thumbwheel, and possibly the auxiliary I/O device 128. The keyboard 132 is preferably a complete alphanumeric keyboard and/or a telephone-type keypad. These composed items may be transmitted over a communication network 220 through the communication subsystem 111 or the short range communication subsystem 141.

For voice communications, the overall operation of the wireless device 210 is substantially similar, except that the received signals would be output to the speaker 134 and signals for transmission would be generated by the microphone 136. Alternative voice or audio I/O subsystems, such as a voice message recording subsystem, may also be implemented on the device 210. Although voice or audio signal output is preferably accomplished primarily through the speaker 134, the display 122 may also be used to provide, for example, an indication of the identity of a calling party, duration of a voice call, or other voice call related information.

The serial port 131 shown in FIG. 2 is normally implemented in a personal digital assistant ("PDA")-type communication device for which synchronization with a user's desktop computer is a desirable, albeit optional, component. The serial port 131 enables a user to set preferences through an external device or software application and extends the capabilities of the device 210 by providing for information or software downloads to the device 210 other than through a wireless communication network 220. The alternate download path may, for example, be used to load an encryption key onto the device 210 through a direct and thus reliable and trusted connection to thereby provide secure device communication.

The short-range communications subsystem 141 shown in FIG. 2 is an additional optional component which provides for communication between the device 210 and different systems or devices, which need not necessarily be similar devices. For example, the subsystem 141 may include an infrared device and associated circuits and components, or a Bluetooth™ communication module to provide for communication with similarly-enabled systems and devices. (Bluetooth™ is a registered trademark of Bluetooth SIG, Inc.)

Figure 3:
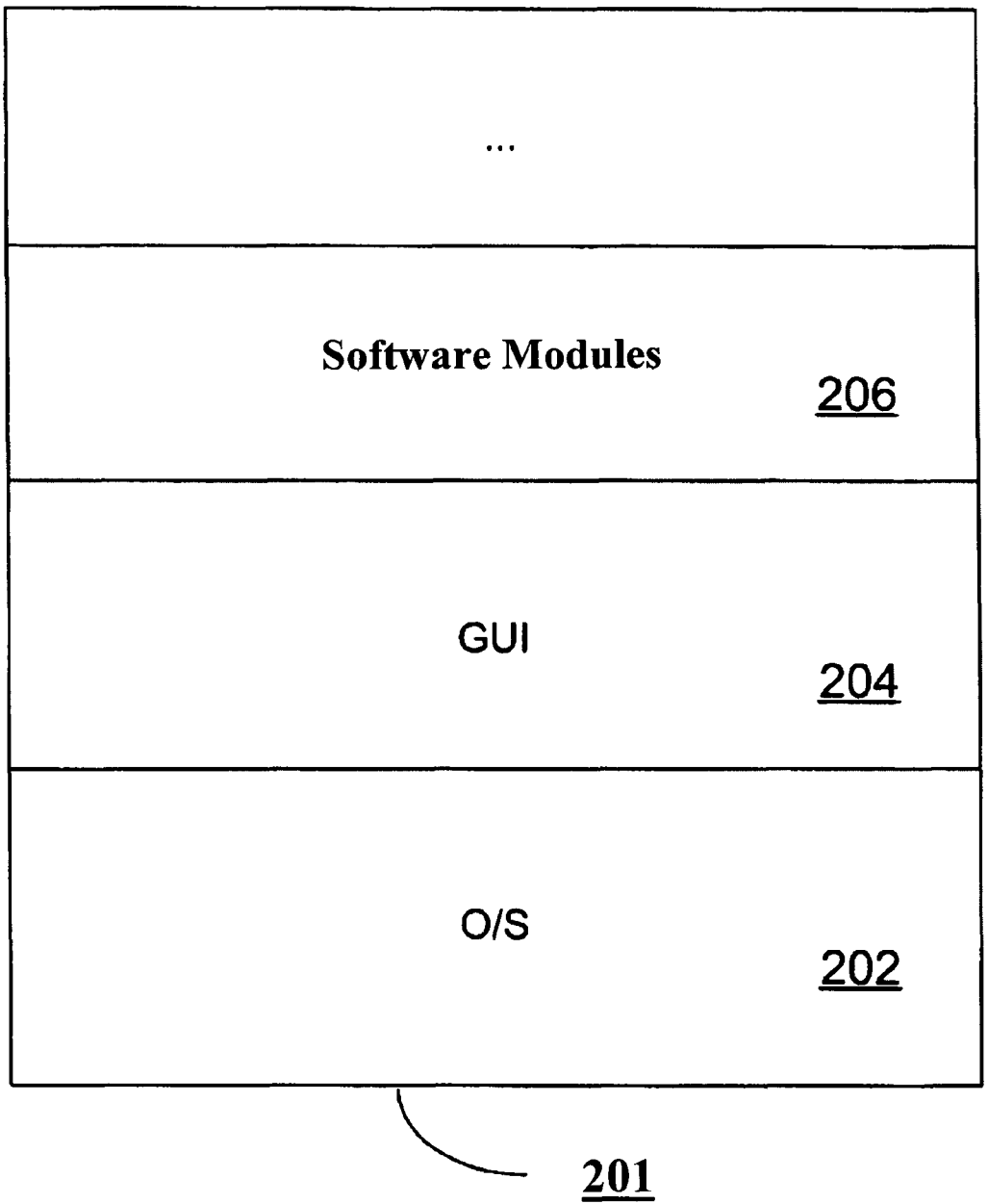
FIG. 3 is a block diagram illustrating a memory of the wireless device of FIG. 2.

FIG. 3 is a block diagram illustrating a memory 201 of the wireless device 210 of FIG. 2. The memory 201 has various software components for controlling the device 210 and may include flash memory 124, RAM 126, or ROM (not shown), for example. In accordance with an embodiment of the invention, the wireless device 210 is intended to be a multi-tasking wireless communications device configured for sending and receiving data items and for making and receiving voice calls. To provide a user-friendly environment to control the operation of the device 210, an operating system ("O/S") 202 resident on the device 210 provides a basic set of operations for supporting various applications typically operable through a graphical user interface ("GUI") 204. For example, the O/S 202 provides basic input/output system features to obtain input from the auxiliary I/O 128, the keyboard 132, the clickable thumbwheel, and the like, and for facilitating output to the user. Though not shown, one or more applications for managing communications or for providing personal digital assistant like functions may also be included. In accordance with an embodiment of the application, there are provided software modules 206 for facilitating the conservation of battery 156 power for the wireless device 210 as will be described below.

Thus, the wireless device 210 includes computer executable programmed instructions for directing the device 210 to implement the embodiments of the present application. The programmed instructions may be embodied in one or more software modules 206 resident in the memory 201 of the wireless device 210. Alternatively, the programmed instructions may be embodied on a computer readable medium (such as a CD disk or floppy disk) which may be used for transporting the programmed instructions to the memory of the wireless device 210. Alternatively, the programmed instructions may be embedded in a computer-readable signal or signal-bearing medium that is uploaded to a network by a vendor or supplier of the programmed instructions, and this signal or signal-bearing medium may be downloaded through an interface 111, 131, 141 to the wireless device 210 from the network by end users or potential buyers.

Figure 4:
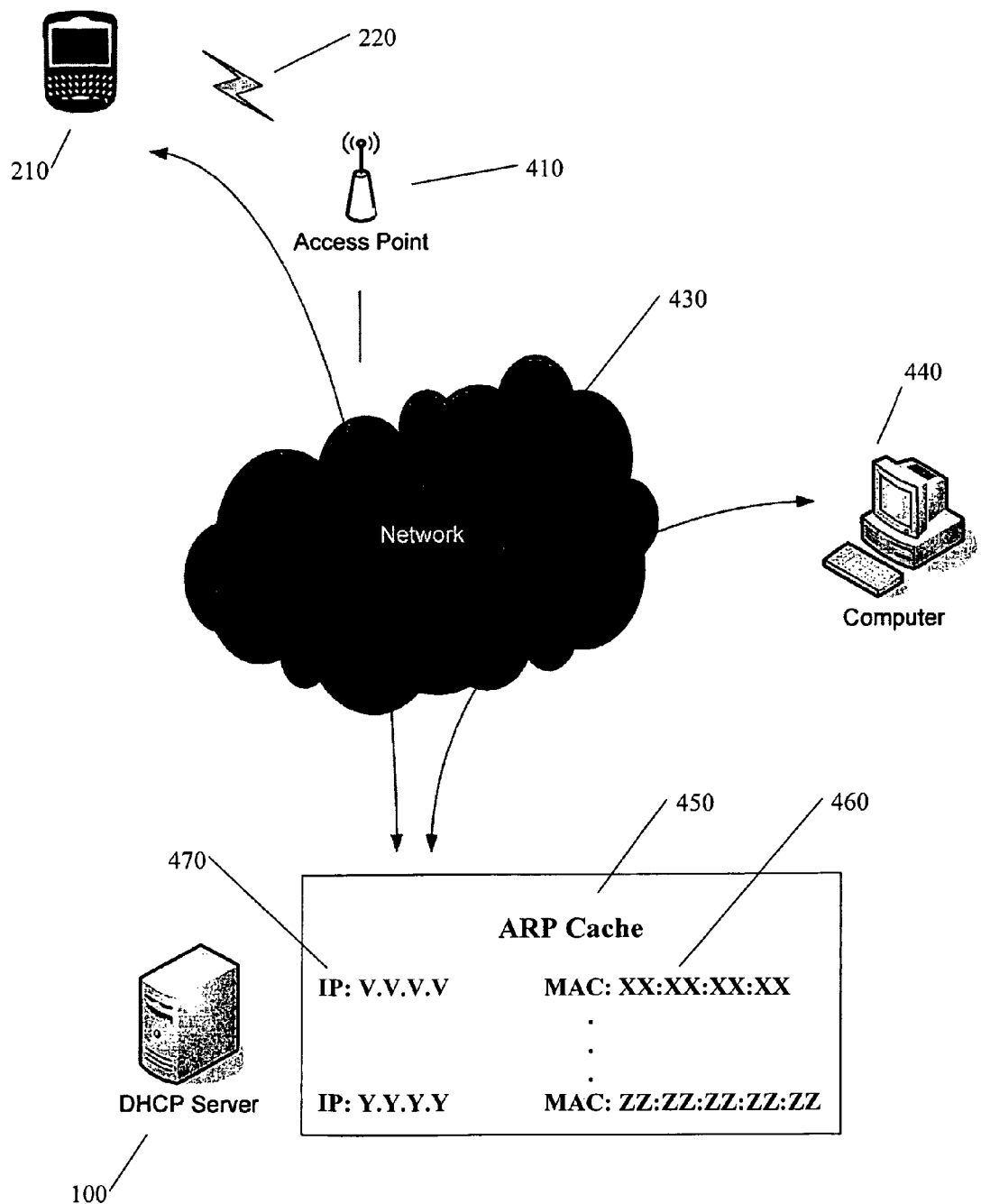
FIG. 4 is a block diagram illustrating a wireless local area network ("WLAN") coupled to a wired LAN in accordance with an embodiment of the application; and, FIG. 5 is a flow chart illustrating operations of software modules within the memory of a server (or data processing system) for conserving battery power in a wireless device coupled through an access point to the server in a network, the server being coupled to at least one client in the network, each of the wireless device, the at least one client, and the access point having a respective hardware address, in accordance with an embodiment of the application.

FIG. 4 is a block diagram illustrating a wireless local area network ("WLAN") 220 coupled to a wired LAN 430 in accordance with an embodiment of the application. One or more wireless devices 210, each adapted for WLAN operation, communicate over the wireless network 220 to one or more WLAN access points 410. The access point 410 is typically an IEEE 802.11 (i.e., Wi-Fi) radio receiver/transmitter (or transceiver) and functions as a gateway or bridge between the WLAN 220 and the wired LAN 430. For security, each access point 410 may be communicatively coupled to the wired LAN 430 through a firewall and/or VPN (not shown).

On the wired LAN side of the optional firewall/VPN is at least one data processing system 100 configured to operate as a Dynamic Host Configuration Protocol ("DHCP") server. The DHCP server 100 may be coupled to one or more client devices or computers 440. The DHCP server 100 and each client 440 may be located at the enterprise customer premises or they may be remote from each other. The client 440 may have a hardware configuration similar to that of the DHCP server 100.

In general, the DHCP server 100 is not tied into the cellular network directly. However, to provide cellular telephone services such as email service, etc., the wireless devices 210 may have access to email enterprise server (not shown) located on the wired LAN 430. The email enterprise server may have a hardware configuration similar to that of the DHCP server 100. Accordingly, the wireless device 210 may be a simple Wi-Fi device or it may be a more sophisticated device include both Wi-Fi and cellular functionality.

Thus, a user of a wireless device 210 may engage in a communication (i.e., voice, data, etc.) with other wireless device 210 users or with the user of a wired client 440, all through the WLAN or wireless network 220 coupled through the access point 410 to the DHCP server 100 and the wired LAN 430.

As mentioned above, an access point 410 is a station that transmits and receives data (sometimes referred to as a transceiver). The access point 410 connects users 210 to other users 440 within the network 220, 430 and also can serve as the point of interconnection between the WLAN 220 and a wired LAN 430. Each access point 410 can serve multiple users 210 within a defined network area. As users move beyond the range of one access point (i.e., when they roam), they are automatically handed over to the next one. A small WLAN may only require a single access point. The number of access points required increases as a function of the number of network users and the physical size of the network. The access point is typically an IEEE 802.11 (i.e., Wi-Fi) radio receiver/transmitter (or transceiver) and functions as a gateway or bridge between a WLAN 220 and a wired LAN 430.

Also as mentioned above, the Address Resolution Protocol ("ARP") is a protocol for mapping an Internet Protocol ("IP") address to a physical machine address that is recognized in the local network. For example, in IP Version 4, an address is 32 bits long. In an Ethernet local area network, however, addresses for attached devices are 48 bits long. The physical machine address is also known as a Media Access Control or "MAC" address. A table or list, usually called the ARP cache 450, is used to maintain a correlation between each MAC address 460 and its corresponding IP address 470. ARP provides the protocol rules for making this correlation and providing address conversion in both directions.

In particular, when a packet destined for a wireless device 210 on a WLAN 220 is to be sent, the originating device (e.g., 440, 210) asks the ARP program to find a physical host or MAC address 460 that matches the IP address 470. The ARP program looks in the ARP cache 450 and, if it finds the address, provides it so that the packet can be converted to the right packet length and format and sent to the device 210. If no entry 460 is found for the IP address 470, ARP broadcasts a request packet in a special format to all the devices 210 on the WLAN 220 to see if one device 210 knows whether it has that IP address 470 associated with it. A device 210 that recognizes the IP address 470 as its own returns a reply so indicating. ARP updates the ARP cache 450 for future reference and the packet is sent to the MAC address 460 of the device that replied.

Also as mentioned above, in a LAN or other network, the MAC (Media Access Control) address 460 is a device's unique hardware number. On an Ethernet LAN, for example, it is the same as an Ethernet address. When a device is connected to the Internet, a correspondence table or list (e.g., an ARP cache 450) relates the IP address 470 to the device's physical MAC address 460 on the LAN. The MAC address 460 is used by the MAC sublayer of the Data-Link Layer ("DLC") of telecommunication protocols. There is a different MAC sublayer for each physical device type.

ARP requests are almost always broadcast to all clients on a network including the target client. A typical broadcast ARP request has an address to "ALL" (e.g., "255.255.255.255" in IPv4) and asks for the MAC address of a target device. It should be noted that, in general, each client 210, 440 maintains a cache of successful ARP requests. This allows the client to avoid processing another ARP request for MAC address that it has recently used. Also, in addition to the IP address 470 and MAC address 460 fields, the ARP cache 450 may also include an age field (not shown) indicating the age of the record in seconds. When a record in the ARP cache 450 reaches a predetermined age, it is renewed with another request.

Now, the DHCP server 100 supports the Dynamic Host Configuration Protocol ("DHCP"). DHCP is a communications protocol that lets network administrators centrally manage and automate the assignment of IP addresses 470 in an enterprise's network 220, 430. Using the IP, each device 210, 440 that can connect to the Internet needs a unique IP address, which is assigned when an Internet connection is created for a specific device. Without DHCP, the IP address must be entered manually at each device in an enterprise and a new IP address must be entered each time a device moves to a new location on the network. DHCP lets a network administrator supervise and distribute IP addresses from a central point and automatically sends a new IP address when a device is plugged into a different place in the network.

DHCP uses the concept of a "lease" or amount of time that a given IP address 470 will be valid for a device 210, 440. The lease time can vary depending on how long a user is likely to require the Internet connection at a particular location. Using very short leases, DHCP can dynamically reconfigure networks in which there are more devices than there are available IP addresses. The protocol also supports static addresses for devices that need a permanent IP address, such as Web servers. A DHCP client is a program that is located in (and perhaps downloaded to) each device 210, 440 so that it can be configured by the DHCP server 100.

Now, the present application provides a system and method for conserving power in wireless devices 210 operating in a WLAN 220. As mentioned above, wireless devices 210 are typically battery 156 operated. As such, conserving battery power is important as doing so allows the wireless device 210 to operate for an extended period of time. To conserve battery power, the wireless device 210 will typically enter a "sleep mode" when it is not actively participating in a communication. During this sleep mode the wireless device 210 will still monitor activity on the WLAN 220 to determine if it should "wake up" and enter into a communication. One problem with wireless devices 210 operating in a WLAN 220 is that when an ARP request is broadcast on the WLAN 220, the wireless devices 210 must wake up and process the ARP request. When a wireless device 210 wakes up it consumes battery power which may reduce battery 156 life. However, each ARP request is generally meant for only one wireless device 210 on the WLAN 220 and not all wireless devices. Consequently, battery power is wasted in those wireless devices 210 for which the ARP request is not meant.

According to one embodiment, to conserve battery power in wireless devices 210 in the WLAN 220, wireless devices 210 and clients 440 that join the network 220, 430 are provided with a pre-compiled MAC address list. This reduces the number of ARP request broadcasts and hence allows wireless devices 210 to conserve battery power. In particular, a reduction in the number of broadcast ARP requests that a wireless device 210 must process leads to a reduction in battery power consumption as the wireless device 210 may remain in sleep mode longer. According to one embodiment, the DHCP server 100 (or access point 410) sends out its latest ARP cache. Accordingly, the pre-compiled MAC address list is an instance of the ARP cache containing the IP <=> MAC listing.

According to one embodiment, the ARP cache 450 is stored in the memory 130 of the DHCP server 100. When a device 210, 440 joins the network 220, 430 and receives an IP address 470 from the DHCP server 100, the device 210, 440 can then request the pre-compiled MAC address list from the ARP cache 450 of the DHCP server 100.

At a minimum, the DHCP server 100 may provide the MAC address of any subnet gateway associated with the device 210, 440 as this MAC address is fairly static and is the most likely address that a client 210, 440 would use. While all clients 210, 430 joining the network 220, 230 should receive the pre-compiled MAC address list as this will result in a reduction in the number of overall ARP request broadcasts, significant battery power will be conserved if the MAC address list contains just the MAC address of any subnet gateways in the network 220, 430.

For reference, a subnet (short for "subnetwork") is an identifiably separate part of an enterprise's network. Typically, a subnet may represent all the devices at one geographic location, in one building, or on the same WLAN or LAN. Having an enterprise's network divided into subnets allows it to be connected to the Internet with a single shared network address. Without subnets, an enterprise could get multiple connections to the Internet, one for each of its physically separate subnetworks, but this would require an unnecessary use of the limited number of network numbers the Internet has to assign. It would also require that Internet routing tables on gateways outside the enterprise would need to know about and have to manage routing that could and should be handled within the enterprise. For example, the WLAN 220 in FIG. 4 may be considered as a subnet of the network 220, 430.

For further reference, a gateway is a network device that acts as an entrance to another network. In the network for an enterprise, a server acting as a gateway often also acts as a proxy server and a firewall server. A gateway is often associated with both a router, which knows where to direct a given packet of data that arrives at the gateway, and a switch, which furnishes the actual path in and out of the gateway for a given packet. Thus, a subnet gateway is a gateway that acts as an entrance to a subnet of a network.

Now, a WLAN gateway or subnet gateway is a device through which all WLAN traffic passes en route to a wired network 430. The gateway doesn't have to be physically placed between an access point 410 and the wired network 430, but it must be on the same IP subnet as the access point 410 it is managing. The WLAN gateway may be incorporated in an access point 410. The gateway enforces policies regarding security, access control, encryption, and quality of service, etc. Thus, a WLAN gateway may function to restrict data packets to a specific area of a network based on their destination address in order to avoid excessive traffic.

According to one embodiment, the access point 410 may be included in the server 100.

According to another embodiment, the ARP cache 450 is stored in the memory (not shown) of the access point 410. In this embodiment, a wireless client 210 joining the network 220, 430 requests the MAC address list after authentication and association has been performed. A wireless device or client 210 usually authenticates itself to an access point 410 by providing an identification ("ID") to prove that it can access the network 220, 430. The details of the authentication process depend on the type of authentication required by the network. Association is the process by which the wireless device or client 210 introduces itself to the access point 410 and includes negotiation with respect to speed of transmissions, sleep time, type of authentication required for entry, etc. This embodiment is advantageous as it allows legacy devices running the current ARP protocol to conserve battery power.

According to another embodiment, the DHCP server 100 updates its ARP cache 450 periodically by sending a unicast ARP request to the respective device 210. This is done to maintain the liveliness of the ARP cache 450. The advantage of using a unicast transmission is that by doing so no other wireless device in the network need be awaken during the ARP request.

According to another embodiment, the access point 410 may replace any broadcast ARP request to a known device 210 with a unicast ARP request. This embodiment is advantageous in cases where the access point 410 is not party to a proxy ARP setup. In addition, if the broadcast ARP request is for a device 440 on the wired network 430, the access point 410 may restrict the broadcast ARP request to just a broadcast on the wired network 430.

According to another embodiment, a wireless device 210 that has accepted its ARP cache from the DHCP server 100, will always return to that server 100 for a updated ARP cache, rather than by maintaining the liveliness of its ARP cache by broadcasting ARP requests. Any IP address 470 not in that ARP cache 450 will be assumed to be set statically and a broadcast request will be sent. In the case where the access point 410 replaces broadcast ARP requests to a known device 210 with a unicast ARP request, the access point 410 will redirect that broadcast ARP request to the correct wireless device 210.

According to another embodiment, the access point 410 may build an ARP cache 450 from association and packet inspection for dynamic and static IP addresses. This may be similar to an ARP cache 450 built by the proxy DHCP server 100. In this case, the access point 410 will proxy the ARP request for static and dynamic IP addresses, in much the same way as described above in the case where the access point 410 replaces broadcast ARP requests to a known device 210 with a unicast ARP request.

The application provides several advantages over prior methods. For example, the application provides for the conservation of battery power by the sharing of ARP cache information between wireless and other devices in a network.

Figure 5:
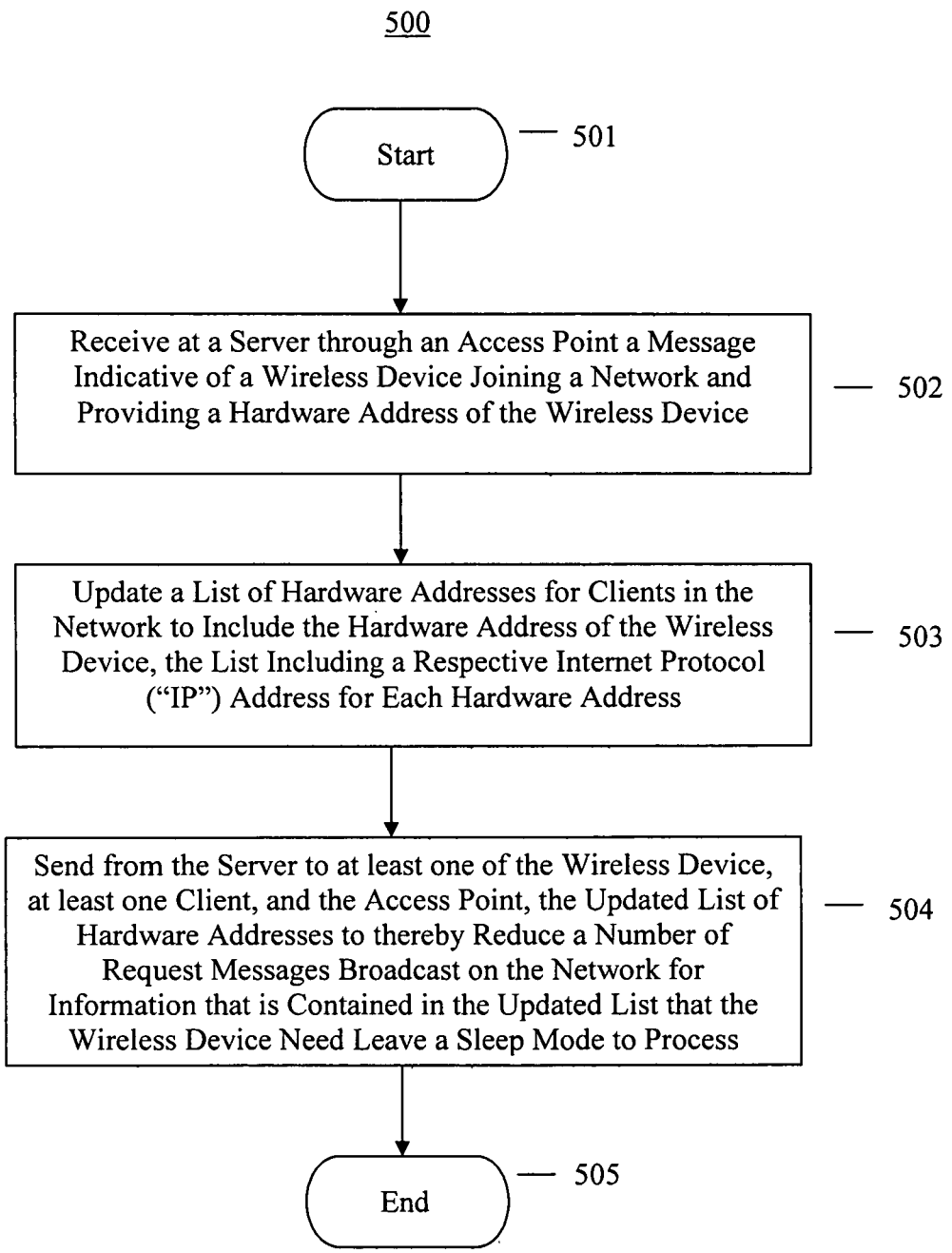

The above described method may be summarized with the aid of a flowchart. FIG. 5 is a flow chart illustrating operations 500 of software modules 170 within the memory 130 of a server 100 (or data processing system 100) for conserving battery power in a wireless device 210 coupled through an access point 410 to the server 100 in a network 430, the server 100 being coupled to at least one client 440 in the network 430, each of the wireless device 210, the at least one client 440, and the access point 410 having a respective hardware address 460, in accordance with an embodiment of the application.

At step 501, the operations 500 start.

At step 502, a message indicative of the wireless device joining the network 430 and providing the hardware address 460 of the wireless device 210 is received at the server 100 through the access point 410.

At step 503, a list of hardware addresses 460 for clients 210, 410, 440 in the network 430 is updated to include the hardware address 460 of the wireless device 210, the list 450 including a respective Internet Protocol ("IP") address 470 for each hardware address 460.

At step 504, the updated list of hardware addresses 450 is sent from the server 100 to at least one of the wireless device 210, the at least one client 440, and the access point 410 to thereby reduce a number of request messages broadcast on the network 430 for information 460, 470 that is contained in the updated list that the wireless device 210 need leave a sleep mode to process.

At step 505, the operations 500 end.

The method may further include assigning an IP address 470 to the wireless device 210. Each hardware address 460 may be a Media Access Control ("MAC") address. The list may be an Address Resolution Protocol ("ARP") cache 450 and each request message may be an ARP request message. The server 100 may be a Dynamic Host Configuration Protocol ("DHCP") server. The wireless device 210 may be coupled to the access point 410 through a wireless local area network ("WLAN") 220. The network 430 may be a local area network ("LAN"). The WLAN 220 may be a subnetwork of the network 430. The access point 410 may include a gateway to the subnetwork 220. The server 100 may include the access point 410. The method may further include the server 100 periodically updating the list 450 by sending a unicast request for information message to one of the wireless device 210, the at least one client 440, and the access point 410. The access point 410 may replace the request messages broadcast on the network 220, 430 with a unicast request for information sent to one of the wireless device 210 and the at least one client 440. The method may further include receiving at the server 100 from the wireless device 210 a request for the updated list 450. And, the list 450 may be updated by the access point 410.

The above described method is generally performed by the data processing system 100. However, according to an alternate embodiment, the method can be performed by the wireless device 210 and/or by the access point 410.

While embodiments of this application are primarily discussed as a method, a person of ordinary skill in the art will understand that the apparatus discussed above with reference to a wireless device 210 and a data processing system 100, may be programmed to enable the practice of the method of these embodiments. Moreover, an article of manufacture for use with a wireless device 210 or data processing system 100, such as a pre-recorded storage device or other similar computer readable medium including program instructions recorded thereon, may direct the wireless device 210 or data processing system 100 to facilitate the practice of the method of these embodiments. It is understood that such apparatus and articles of manufacture also come within the scope of the application.

The embodiments of the application described above are intended to be exemplary only. Those skilled in this art will understand that various modifications of detail may be made to these embodiments, all of which come within the scope of the application.

What is claimed is:

1. A method for conserving battery power in a wireless device coupled through an access point to a server in a network, the server being coupled to at least one client in the network, each of the wireless device, the at least one client, and the access point having a respective hardware address, the method comprising:
   receiving at the server through the access point a message indicative of the wireless device joining the network and providing the hardware address of the wireless device;
   updating a list of hardware addresses for clients in the network to include the hardware address of the wireless device, the list including a respective Internet Protocol ("IP") address for each hardware address; and,
   sending from the server to at least one of the wireless device, the at least one client, and the access point, the updated list of hardware addresses to thereby reduce a number of request messages broadcast on the network for information that is contained in the updated list that the wireless device need leave a sleep mode to process.

2. The method of claim 1 and further comprising assigning an IP address to the wireless device.

3. The method of claim 1 wherein each hardware address is a Media Access Control ("MAC") address.

4. The method of claim 1 wherein the list is an Address Resolution Protocol ("ARP") cache and each request message is an ARP request message.

5. The method of claim 1 wherein the server is a Dynamic Host Configuration Protocol ("DHCP") server.

6. The method of claim 1 wherein the wireless device is coupled to the access point through a wireless local area network ("WLAN").

7. The method of claim 6 wherein the network is a local area network ("LAN").

8. The method of claim 7 wherein the WLAN is a subnetwork of the network.

9. The method of claim 8 wherein the access point includes a gateway to the subnetwork.

10. The method of claim 9 wherein the server includes the access point.

11. The method of claim 1 and further comprising the server periodically updating the list by sending a unicast request for information message to one of the wireless device, the at least one client, and the access point.

12. The method of claim 1 wherein the access point replaces the request messages broadcast on the network with a unicast request for information sent to one of the wireless device and the at least one client.

13. The method of claim 1 and further comprising receiving at the server from the wireless device a request for the updated list.

14. The method of claim 1 wherein the list is updated by the access point.

15. A system for conserving battery power in a wireless device coupled through an access point in a network to the system, the system being coupled to at least one client in the network, each of the wireless device, the at least one client, and the access point having a respective hardware address, the system comprising:
   a processor coupled to the network; and,
   a program executed by the processor, the program including:
   a module for receiving through the access point a message indicative of the wireless device joining the network and providing the hardware address of the wireless device;
   a module for updating a list of hardware addresses for clients in the network to include the hardware address of the wireless device, the list including a respective Internet Protocol ("IP") address for each hardware address; and, a module for sending to at least one of the wireless device, the at least one client, and the access point, the updated list of hardware addresses to thereby reduce a number of request messages broadcast on the network for information that is contained in the updated list that the wireless device need leave a sleep mode to process.

16. The system of claim 15 and further comprising a module for assigning an IP address to the wireless device.

17. The system of claim 15 wherein each hardware address is a Media Access Control ("MAC") address.

18. The system of claim 15 wherein the list is an Address Resolution Protocol ("ARP") cache and each request message is an ARP request message.

19. The system of claim 15 wherein the system is a Dynamic Host Configuration Protocol ("DHCP") server.

20. The system of claim 15 wherein the wireless device is coupled to the access point through a wireless local area network ("WLAN").

21. The system of claim 20 wherein the network is a local area network ("LAN").

22. The system of claim 21 wherein the WLAN is a subnetwork of the network.

23. The system of claim 22 wherein the access point includes a gateway to the subnetwork.

24. The system of claim 23 wherein the system includes the access point.

25. The system of claim 15 and further comprising a module for periodically updating the list by sending a unicast request for information message to one of the wireless device, the at least one client, and the access point.

26. The system of claim 15 wherein the access point replaces the request messages broadcast on the network with a unicast request for information sent to one of the wireless device and the at least one client.

27. The system of claim 15 and further comprising a module for receiving from the wireless device a request for the updated list.

28. The system of claim 15 wherein the list is updated by the access point.

29. A computer program product having computer-executable code stored on a non-transitory computer-readable medium for directing a system to conserve battery power in a wireless device coupled through an access point in a network to the system, the system being coupled to at least one client in the network, each of the wireless device, the at least one client, and the access point having a respective hardware address, the code comprising:

code for receiving at the system through the access point a message indicative of the wireless device joining the network and providing the hardware address of the wireless device;

code for updating a list of hardware addresses for clients in the network to include the hardware address of the wireless device, the list including a respective Internet Protocol ("IP") address for each hardware address; and, code for sending from the system to at least one of the wireless device, the at least one client, and the access point, the updated list of hardware addresses to thereby reduce a number of request messages broadcast on the network for information that is contained in the updated list that the wireless device need leave a sleep mode to process.

30. The computer program product of claim 29 and further comprising code for assigning an IP address to the wireless device.

31. The computer program product of claim 29 wherein each hardware address is a Media Access Control ("MAC") address.

32. The computer program product of claim 29 wherein the list is an Address Resolution Protocol ("ARP") cache and each request message is an ARP request message.

33. The computer program product of claim 29 wherein the system is a Dynamic Host Configuration Protocol ("DHCP") server.

34. The computer program product of claim 29 wherein the wireless device is coupled to the access point through a wireless local area network ("WLAN").

35. The computer program product of claim 34 wherein the network is a local area network ("LAN").

36. The computer program product of claim 35 wherein the WLAN is a subnetwork of the network.

37. The computer program product of claim 36 wherein the access point includes a gateway to the subnetwork.

38. The computer program product of claim 37 wherein the system includes the access point.

39. The computer program product of claim 29 and further comprising code for the system periodically updating the list by sending a unicast request for information message to one of the wireless device, the at least one client, and the access point.

40. The computer program product of claim 29 wherein the access point replaces the request messages broadcast on the network with a unicast request for information sent to one of the wireless device and the at least one client.

41. The computer program product of claim 29 and further comprising code for receiving at the server from the wireless device a request for the updated list.

42. The computer program product of claim 29 wherein the list is updated by the access point.

* * * * *